No. 891,560. PATENTED JUNE 23, 1908.
F. E. MÜLLER.
REFRIGERATING APPARATUS EMPLOYING CARBONIC ACID.
APPLICATION FILED APR. 29, 1907.

Witnesses:
W. P. Burke
A. F. Shuman

Inventor:
Franz Eugen Müller

UNITED STATES PATENT OFFICE.

FRANZ EUGEN MÜLLER, OF DRESDEN, GERMANY, ASSIGNOR TO BENNO KOSSMANN, OF COLOGNE, GERMANY.

REFRIGERATING APPARATUS EMPLOYING CARBONIC ACID.

No. 891,560.  Specification of Letters Patent.  Patented June 23, 1908.

Application filed April 29, 1907. Serial No. 370,884.

*To all whom it may concern:*

Be it known that I, FRANZ EUGEN MÜLLER, engineer, subject of the German Emperor, residing at Dresden, Germany, have invented new and useful Improvements in Refrigerating Apparatus Employing Carbonic Acid, of which the following is a specification.

This invention relates to a refrigerating apparatus which is adapted for use in any household, and especially in hotels, restaurants, hospitals, on shipboard and the like.

The apparatus is adapted for making fruit ices, cooling foods, drinks and the like and as experiments have shown enables the desired refrigerating action to be extremely rapidly obtained, while it is also extremely simple to handle, so that the making of fruit ices for instance requires only from 1 to 2 minutes of time, and water may be congealed in one minute, and so forth.

An example of construction of the apparatus is shown in the accompanying drawings in which:—

Figure 1:
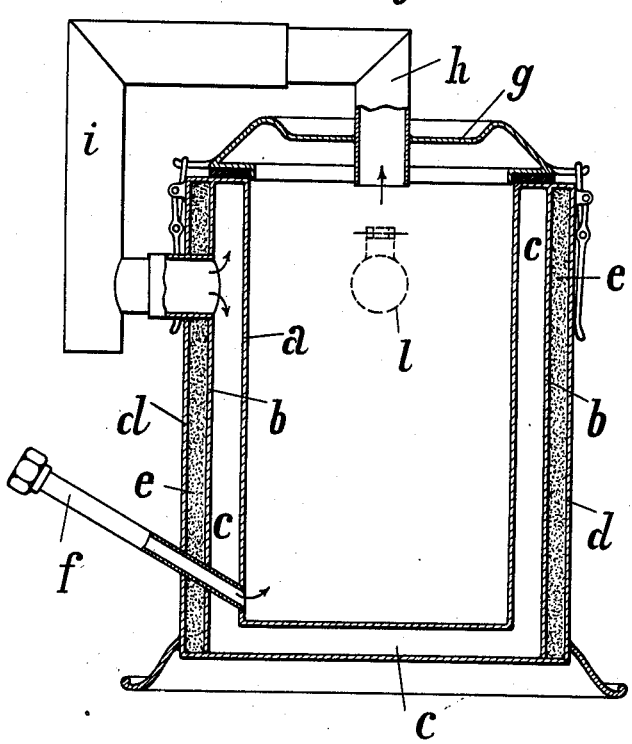
Figure 2:
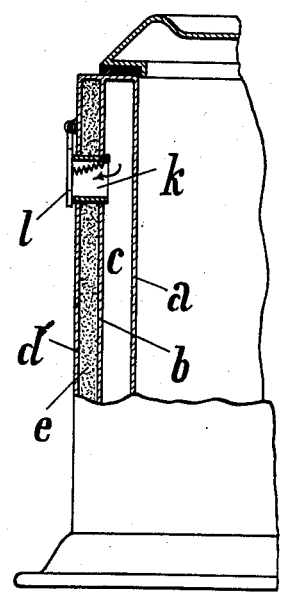
Figure 3:
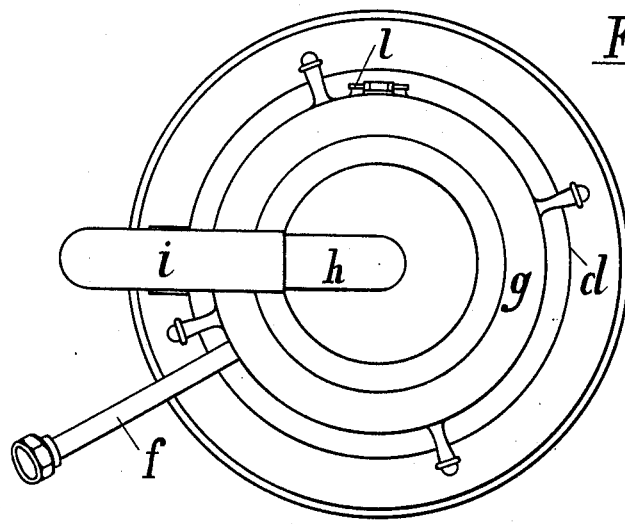

Figure 1 is a vertical section of the apparatus; and Fig. 2, a view partly in section showing the valve; and Fig. 3, a plan view.

The invention consists in means for obtaining in a refrigerating apparatus operated with carbonic acid, the greatest possible result with the carbonic acid and a practical production of the frozen substances. The carbonic acid introduced into the tightly closed refrigerating chamber of the apparatus after having produced the low temperature by its expansion in its passage through the substances to be frozen, is conveyed on escaping from the refrigerating chamber to one of the chambers which entirely inclose the former, in which outer chamber it can further expand and cause a further cooling of the refrigerating chamber. The thereby increased cooling action is further assisted by the outlet aperture through which the carbonic acid leaves the apparatus being if desired provided with a spring weighted valve (flap valve or the like), whereby the escaping carbonic acid is throttled and thus its violent escape moderated. The carbonic acid is consequently compelled to act more intensively in the chamber of the refrigerator so that the consumption of carbonic acid is very small and the refrigerating apparatus is economical in working. The escaping carbonic acid may if desired be also further utilized for instance in the manufacture of mineral water or the like.

The apparatus consists of an actual refrigerating chamber $a$ which is inclosed in a large case $b$ in such a way that a hollow chamber $c$ remains all around and at the bottom. A jacket $d$ is also provided round the external walls of the chamber $b$ and the interstice thus formed is filled with a material which is a bad conductor of heat in order to avoid loss of cold.

One of the ordinary steel bottles filled with carbonic acid is connected with the outer end of a pipe $f$, the inner end of which pipe connects with the lower part of the refrigerating chamber $a$ in proximity to the bottom of the latter. When the valve of the bottle is opened, the carbonic acid enters the lower part of the refrigerating chamber. The latter contains the substance or substances to be refrigerated and is hermetically closed above by means of a removable cover or lid $g$. The carbonic acid which expands in its passage through the substance to be frozen inside the refrigerating chamber and thereby produces intense cold, escapes at the upper end of the chamber through a pipe $h$ located in the cover and through a bent pipe $i$ inserted therein, into the chamber $c$ which surrounds the refrigerating chamber $a$ on all sides and at the bottom. Within this chamber $c$ the carbonic acid can further expand and flow round all sides of the refrigerating chamber so that the latter is still further cooled.

The carbonic acid escapes from the chamber $c$ through an aperture $k$ (Fig. 2) on which a preferably external valve $l$ is provided which closes automatically either by the pressure of a spring or by its own weight and thus opposes a certain resistance to the escaping carbonic acid. The carbonic acid is thereby throttled and its violent escape moderated, so that it can flow actively and on all sides round the refrigerator inside the chamber $c$. The escape of the carbonic acid takes place either into the open air, or a further pipe may be connected with the aperture $k$, in order to render the escaping carbonic acid available for other suitable purposes also (such as the manufacture of mineral waters and the like.)

The lower end of the pipe $h$ through which the carbonic acid escapes from the refrigerating vessel is preferably formed as a cap in order to prevent the vigorously rising carbonic acid carrying with it into the pipe $h$ and chamber *c* portions of the contents, which are to be refrigerated, of the vessel *a*.

I declare that what I claim is:

1. A refrigerating apparatus comprising an inner vessel, a cover therefor, an outer vessel having heat non-conducting walls, forming a space between itself and the inner vessel, means for introducing carbonic acid into the inner vessel, a pipe leading from the top of the inner vessel through the walls of the outer vessel to the said space and a valve controlled pipe in the walls of the outer vessel connecting the space with the atmosphere.

2. A freezing apparatus, comprising an outer vessel, a freezing cell and means for introducing carbonic acid into the freezing cell near the bottom thereof where it expands at first within the latter, and then flows directly through the substance to be frozen, then flows into the shallow space between the vessel and cell and which surrounds the freezing cell from all sides so that the acid in that way comes in contact with the whole freezing cell and the walls thereof from the inside as well as from the outside, in order to attain an intense frigidity.

In testimony whereof I have signed my name to this specification in the presence of two subscribing witnesses.

FRANZ EUGEN MÜLLER.

Witnesses:
JULIUS KRAYN,
JEAN GRUND.